US009293888B2

(12) United States Patent
Rockwell et al.

(10) Patent No.: US 9,293,888 B2
(45) Date of Patent: Mar. 22, 2016

(54) METHOD AND APPARATUS FOR HIGH-POWER RAMAN BEAM-COMBINING IN A MULTIMODE OPTICAL FIBER (71) Applicant: Raytheon Company, Waltham, MA (US)

(72) Inventors: David A. Rockwell, Culver City, CA (US); Vladimir V. Shkunov, San Pedro, CA (US)

(73) Assignee: Raytheon Company, Waltham, MA (US)

( * ) Notice: Subject to any disclaimer, the term of this patent is extended or adjusted under 35 U.S.C. 154(b) by 43 days.

(21) Appl. No.: 14/067,751

(22) Filed: Oct. 30, 2013

(65) Prior Publication Data
US 2015/0117473 A1   Apr. 30, 2015

(51) Int. Cl.
*H01S 3/30* (2006.01)
*H01S 3/067* (2006.01)
*H01S 3/094* (2006.01)
*H01S 3/042* (2006.01)
*H01S 3/16* (2006.01)
*G02B 6/28* (2006.01)

(52) U.S. Cl.
CPC .............. *H01S 3/302* (2013.01); *H01S 3/0672* (2013.01); *H01S 3/06729* (2013.01); *H01S 3/06754* (2013.01); *G02B 6/2821* (2013.01); *H01S 3/042* (2013.01); *H01S 3/06704* (2013.01); *H01S 3/06733* (2013.01); *H01S 3/09408* (2013.01); *H01S 3/094007* (2013.01); *H01S 3/1695* (2013.01)

(58) Field of Classification Search
CPC ... H01S 3/302; H01S 3/0672; H01S 3/06729; H01S 3/06754
See application file for complete search history.

(56) References Cited

U.S. PATENT DOCUMENTS

| 4,106,850 | A | * | 8/1978 | Marcatili | 385/124 |
| 4,616,898 | A | * | 10/1986 | Hicks, Jr. | 385/24 |
| 5,892,615 | A | * | 4/1999 | Grubb et al. | 359/341.31 |
| 5,898,715 | A | * | 4/1999 | LeGrange et al. | 372/6 |
| 6,363,087 | B1 | * | 3/2002 | Rice | 372/3 |
| 6,904,219 | B1 | | 6/2005 | Fermann | |
| 7,983,312 | B2 | | 7/2011 | Shkunov et al. | |
| 8,014,426 | B2 | | 9/2011 | Shkunov et al. | |
| 2004/0095968 | A1 | * | 5/2004 | Avizonis et al. | 372/6 |
| 2005/0024716 | A1 | * | 2/2005 | Nilsson et al. | 359/341.31 |
| 2005/0123007 | A1 | | 6/2005 | Rice et al. | |
| 2010/0189137 | A1 | * | 7/2010 | Shkunov et al. | 372/6 |

(Continued)

OTHER PUBLICATIONS

Steven J. Augst, et al., "Beam combining of ytterbium fiber amplifiers (Invited)", Optical Society of America, vol. 24, No. 8, Aug. 2007, p. 1707-1715.

(Continued)

*Primary Examiner* — Eric Bolda (57) ABSTRACT

According to an embodiment of the disclosure, a system for producing a higher power laser beam is provided. The system includes an optical fiber having a length. The optical fiber is configured to receive inputs from multiple laser pumps and an input from a Stokes seed laser pump. The optical fiber has a core that is doped. The core, when viewed from a cross-section of the optical fiber, has a higher concentration of doping at a location near an axis of the optical fiber than a location further from the axis of the optical fiber. The optical fiber is also configured to convert pump power to Stokes power along the length of the optical fiber when subjected to a Stimulated Raman Scattering (SRS) process.

20 Claims, 5 Drawing Sheets (56) References Cited

U.S. PATENT DOCUMENTS

2010/0189401 A1* 7/2010 Shkunov et al. .............. 385/129
2012/0275475 A1 11/2012 Shkunov et al.

OTHER PUBLICATIONS

Nathan B. Terry, et al., "Beam quality of the Stokes output of continuous-wave Raman fiber amplifiers using multimode fiber", Optical Society of America, Vo. 25, No. 9, Sep. 2008, p. 1430-1436.

Nathan B. Terry, et al., "An explanation of SRS beam cleanup in graded-index fibers and the absence of SRS beam cleanup in step-index fibers", Optics Express, vol. 15, No. 26, Dec. 24, 2007, p. 17509-17519.

C. A. Codemard, et al., "High-power continuous-wave cladding-pumped Raman fiber laser", Optics Letters, vol. 31, No. 15, Aug. 1, 2006, p. 2290-2292.

Christian Wirth, et al., "High average power spectral beam combining of four fiber amplifiers to 8.2 kW", Optics Letters, vol. 36, No. 16, Aug. 15, 2011, p. 3118-3120.

Shawn M. Redmond, et al., "Diffractive coherent combining of a 2.5 kW fiber laser array into a 1.9 kW Gaussian beam", Optics Letters, vol. 37, No. 14, Jul. 15, 2012, p. 2832-2834.

Arup Polley, et al., "Raman Amplification in Multimode Fiber", IEEE Photonics Technology Letters, vol. 19, No. 4, Feb. 15, 2007, p. 218-220.

International Search Report and Written Opinion dated Nov. 20, 2014 in connection with international Application No. PCT/US2014/053192; 14 pages.

* cited by examiner

METHOD AND APPARATUS FOR HIGH-POWER RAMAN BEAM-COMBINING IN A MULTIMODE OPTICAL FIBER

TECHNICAL FIELD

The present invention relates in general to fiber lasers and amplifiers and more particularly to a method and apparatus for high-power Raman beam-combining in a multimode optical fiber.

BACKGROUND OF THE DISCLOSURE

In the field of fiber lasers and amplifiers, recent developments have been focused on improving power, efficiency, beam quality and packaging characteristics. One of the difficult tasks in this field of fiber lasers is power scalability, since output power for individual fiber lasers and amplifiers is still limited to less than 10 kW due to the small lasing core area and heat-sink limitations. Nevertheless, there are a variety of applications that need a high-power laser source, and the primary approach to achieving this is to employ a beam combining (BC) technique to produce a multi-fiber laser source that can be scalable to high power. Such techniques still suffer from one or more of the following: lack of high efficiency, degraded beam quality, constraints on individual laser characteristics, system complexity, packaging constraints and need for free-space optics or an optical bench. These beam combining techniques still suffer from not being scalable to powers of 100 kW or more.

SUMMARY

Given the above concerns, a method and apparatus for high-power Raman beam-combining in a multimode optical fiber has been provided that, in certain embodiments, addresses the problems of power scalability.

According to an embodiment of the disclosure, a system for producing a higher power laser beam is provided. The system includes an optical fiber having a certain length. The optical fiber is configured to receive inputs from multiple laser pumps and an input from a Stokes seed laser. The optical fiber has a multi-mode core that is doped with one or more elements. The core, when viewed from a cross-section of the optical fiber, has a rectangular high-aspect-ratio shape having a higher doping concentration at a location near an axis of the optical fiber than a location further from the axis of the optical fiber. The optical fiber is also configured to convert pump energy to Stokes energy along the length of the optical fiber when subjected to a stimulated Raman scattering (SRS) process. In some embodiments, the core is surrounded by a high-aspect-ratio pump cladding, and pump light is optically couple) into the pump cladding. The pump cladding is embedded into the outer cladding, which is covered by a polymer coating.

Certain embodiments may provide various technical advantages depending on the implementation. For example, a technical advantage of some embodiments having rectangular-shaped multi-mode core and pump cladding accommodating high pump power may include the capability to keep the ratio of core area to cladding area to a minimum of 0.25. Yet another technical advantage of some embodiments may include limiting the Raman log-gain product gIL to values about 10 that allows, in a combination with a high core-to-cladding area ratio, the elimination of higher-order Stokes generation. In such scenarios, the refractive indices satisfy the general relationship $n_s > n_r > n_c$ where $n_s$ is the index of refraction of the core, $n_r$ is the refractive index of the pump cladding and $n_c$ is the refractive index of the outer clad, to confine first Stokes signal within the fiber core and the pump light within the pump cladding. Yet another technical advantage of some embodiments may include the capability to maintain a monolithic, all-glass architecture. Still yet another technical advantage of some embodiments may include the capability to operate with broad spectral bandwidths per individual fiber channel such that stimulated Brillouin scattering (SBS) is no longer a limiting process, thereby allowing one to construct a high-power Raman laser using the most powerful available fiber lasers with spectral widths as broad as a few nm. Still yet another technical advantage of some embodiments may include the capability to increase lengths of individual fibers, since SBS is suppressed, thereby mitigating any thermal-loading challenges in the individual fiber amplifiers. Still yet another technical advantage of some embodiments may include the capability to obtain high beam-combining efficiencies of greater than 90%. Still yet another technical advantage may include the capability to produce robust good quality beams using gain-filtering and loss-filtering effects to suppress higher-order transverse modes of the core. The strength of the fundamental-mode selection can be enhanced, in some embodiments, by adding gradual refractive-index variations in the layers of the pump cladding adjacent to the large faces of the rectangular core, and by arranging for a lower index near the core axis with the index increasing near the narrow rectangular-core edges. As a result of this refractive-index variation, the numerical aperture (NA) of the core in the thin direction spatially varies along the wide core dimension. Still yet another technical advantage of some embodiments may include the capability to directly pump with high-brightness diode lasers, thereby eliminating the intermediate step, and efficiency reduction, of using the diode lasers to pump the individual fiber lasers that, in turn, pump the Raman laser. This is achieved by specifying that the rectangular shape of the pump cladding must have an etendue that is equal to or larger than the etendue of the pump-diode bars that are also assumed to have a rectangular geometry.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

Due to the limited power scalability of existing fiber lasers, beam combining techniques can be used to scale fiber-based laser sources to high powers. One of such beam combining technique is spectral beam combining (SBC). SBC involves overlapping multiple fiber lasers, each operating at a specific wavelength, at a common location on a diffraction grating. The angles of incidence of the individual beams systematically vary with the individual wavelengths such that all beams are diffracted by the grating into the same direction. Laser output powers of the order of tens of kW can be obtained through SBC.

Another approach to combining fiber lasers is coherent beam combining (CBC). CBC uses optical phase modulators and a feedback loop to lock an array of fiber amplifiers to a common phase, and then spatially combine the fibers into a single beam using mirrors or a diffractive optical element (DOE). These often require free-space optics. An active electronic control loop is employed to measure the phase errors of each amplifier path and apply a correction by means of the phase modulator to drive all phase errors to zero. Laser output powers of less than 10 kW can be obtained through CBC.

Power scaling using SBC and CBC techniques to meet the needs of high power laser applications (e.g., requiring upwards of 100 kW) have serious technical challenges. Practical realization of SBC and CBC beam combining has required a considerable degree of complexity beyond just having to package a large number of optical components. The SBC technique requires accurate sorting of wavelengths of the individual channels, and it is restricted by beam distortions upon reflection from diffraction grating and also the heavy thermal load on the grating itself. Individual fibers for CBC are impacted by the Stimulated Brillouin Scattering process that limits the power levels to less than 10 kW. With phase and frequency modulation techniques applied to individual beams, power levels can be increased to moderate levels, but are still considerably less than the power levels needed by high power laser applications. Operational bandwidths are also limited to the range of 10 to 30 GHz. The effect of SBS also limits the length of the fiber, which in turn limits the thermal load that can be handled in these fibers.

Certain deficiencies of SBC and CBC techniques can be overcome by using an alternative BC approach based on stimulated Raman scattering. In this approach using SRS, the outputs of multiple fiber lasers are directed into a nonlinear medium of comprising a Raman combiner along with a Stokes-shifted seed beam and the beam intensities, and Raman-fiber length are optimized to provide the proper gain for the Stokes seed beam. For example, a typical Raman gain of 10-40 dB can be used. Certain embodiment of the disclosure can achieve over 90% in power efficiency with a final beam quality better than 1.3.

In certain embodiment of the disclosure, optical fiber is used as a Raman medium, compared to traditional gaseous, liquid or crystalline Raman media. These embodiments use Raman beam combining as opposed to amplification in conventional fiber Raman amplifiers. In traditional fiber Raman amplifier, a single pump laser and Stokes signal beam are both assumed to be single-mode, and they are launched into a single-mode silica fiber, and the Raman amplification occurs along an extended fiber length. Fiber based Raman oscillators require a single-mode pump, thereby beam limiting the output power to less than few hundred watts due to various nonlinear phenomena and optical damage. In contrast, certain embodiments of the disclosure use very large area multimode fiber core overcoming the power limitations of single-mode fibers.

Figure 4:
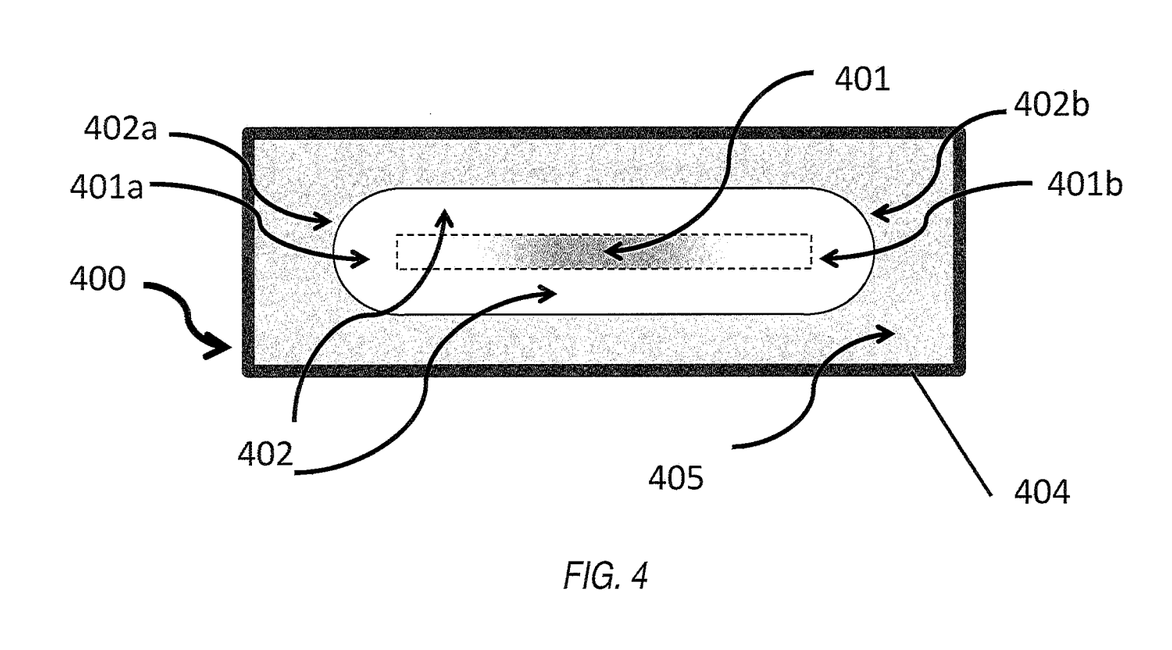
FIG. 4 shows a rectangular Raman fiber with curved edges, of a signal cladding around a rectangular doped core, according to an embodiment of the disclosure.

This disclosure provides a method and an apparatus for generating a high power laser using Raman beam combining. One embodiment of the disclosure uses a rectangular semi-guiding high-aspect-ratio-core (SHARC) fiber that is designed to maintain good beam quality in both transverse dimensions despite the very large core area. The core is doped with Ge with a spatial distribution that has the highest concentration along the fiber axis and nearly zero concentration at the core edges. Since Raman gain grows in proportion to Ge doping density, this spatial variation provides a desirable gain distribution and highly effective mode discrimination via gain filtering. The core edges are designed not to guide light, such that higher-order core modes in the wide dimension leak out of the core; this constitutes mode discrimination via loss filtering. In a SHARC fiber this is achieved by properly matching the refractive indexes of the core and pump cladding at the core edges. In one embodiment, the refractive index of the cladding layers 202 above and below the rectangular core 201, FIG. 2, or the cladding 402 around core 401, FIG. 4, is spatially profiled to reach a minimum near the core middle. As a result, a numerical aperture of the core in the thin directions becomes profiled too, reaching its maximum near the core middle and vanishing at the core edges to allow high-order modes to leak out of the core. In one embodiment, the long Raman fiber is coiled and cooled. As described in more detail below, the exemplary embodiments of the aspect ratio of the core and pump cladding areas, and the doping profile of Ge in the core of the fiber, all contribute to achieve the goal of high output power with high conversion efficiency. In one embodiment, the product gIL (where g is Raman gain coefficient, I is intensity and L is length of the fiber) is kept around 10 to achieve a final output Stokes power of over 100 kW.

Figure 1:
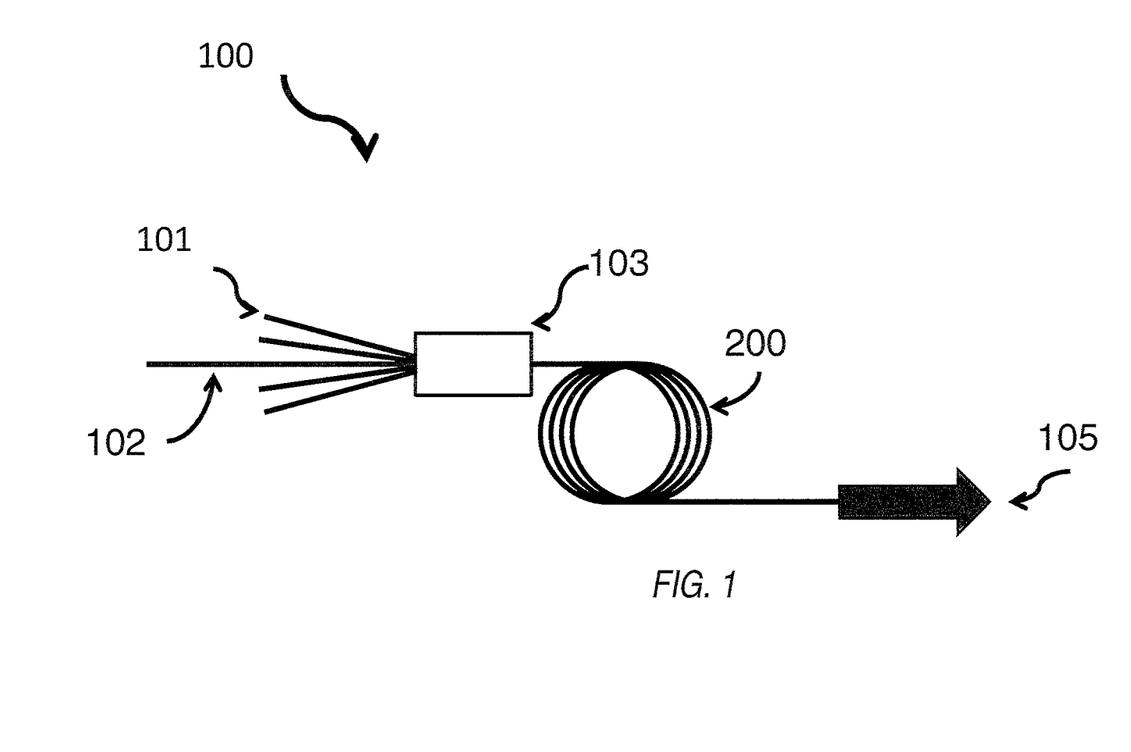
FIG. 1 shows a High Energy Laser (HEL) Raman beam combining architecture, according to an embodiment of the disclosure.

FIG. 1 shows a HEL Raman beam combining architecture 100, according to an embodiment of the disclosure. In the HEL Raman beam combining architecture 100, multiple fiber lasers 101 are directed into a large-core Raman fiber 200 along with a Stokes-shifted seed beam 102. A fused pump and signal combiner 103 launches the multiple mode input pump beams into a specially designed Raman fiber 200, which is described more with reference to FIG. 2. The Raman fiber 200 has unique design characteristics described below, and it is coilable for compact packaging. In some embodiments, the Raman fiber 200 can be longer than 100 meters in length while in other embodiments, the Raman fiber 200 can be shorter than 100 meters. The high-power StokeS shifted output beam 105 emerges at the other end of the Raman fiber 200. In particular configurations, the HEL Raman beam-combining architecture 100 need not have any energy storing devices, and a high efficiency output laser beam is accomplished using nonlinear optical Raman gain mechanisms.

Figure 2:
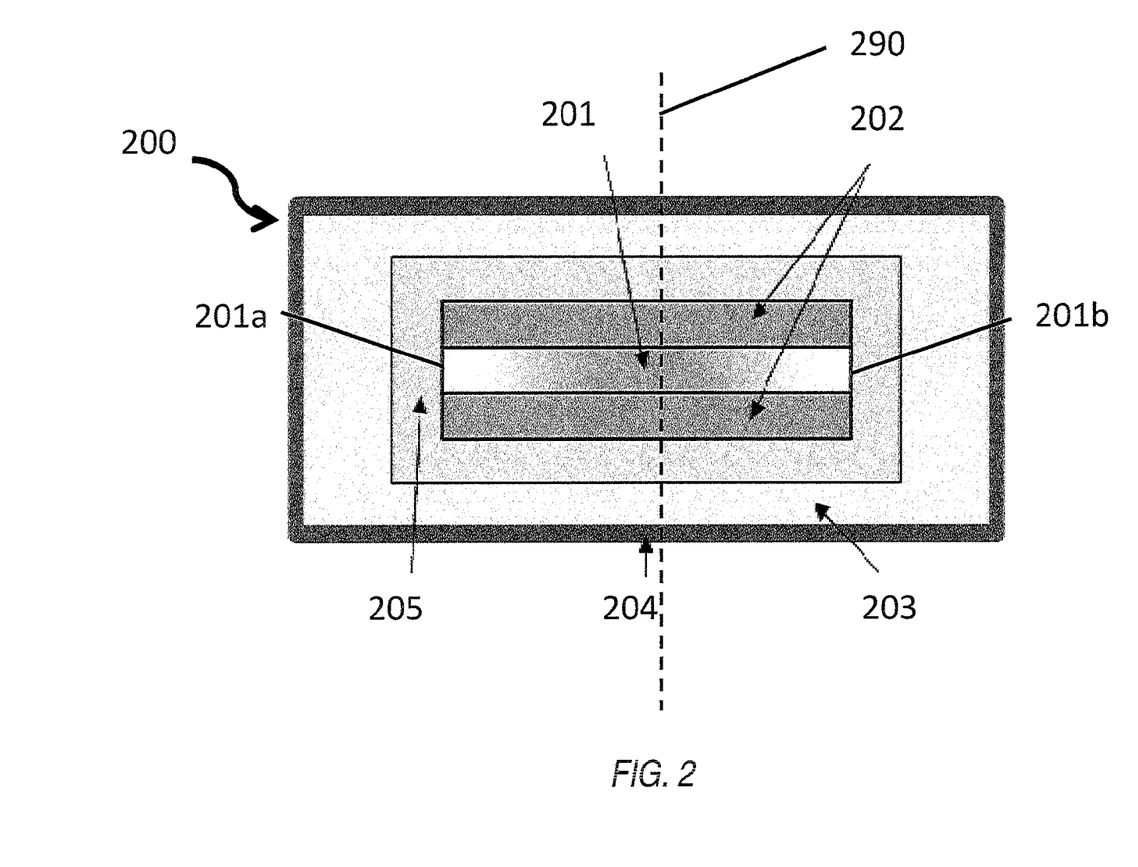
FIG. 2 shows a schematic cross-section of the Raman fiber of FIG. 1, according to an embodiment of the disclosure.

FIG. 2 shows a schematic cross-section of the Raman fiber 200 of FIG. 1, according to an embodiment of the disclosure. At the center of the Raman fiber 200 is a semi-guiding core 201 that is sandwiched between two signal claddings 202 that enable total internal reflection (TIR) guiding at those interfaces. The core 201 is doped with appropriate dopant such as Ge or other dopants known to one skilled in the art to enhance Raman gain. As seen with shading in the core 201, the dopant is provided with a spatial distribution that has the highest concentration along the fiber axis (highest concentration area indicated by dashed line 290) and nearly zero concentration at the edges 201a, 201b of the core—the dark shading indicating a higher concentration. Since the doping increases the Raman gain, the spatial variation in the dopant concentration yields the greatest Raman gain along the fiber axis. Such a gain distribution is designed to provide highly effective mode discrimination via gain filtering: e.g., the desired fundamental mode has the greatest overlap with the dopant such as Ge and therefore the greatest gain. The edges 201a, 201b of the core 201 are designed not to guide light, such that higher-order core modes in the wide dimension leak out of the core; this constitutes mode discrimination via loss filtering. A loss-filtering effect can be enhanced by additional profiling of the numerical aperture of the core along wide-axis direction, so that the NA is diminishing near the core edges, and guiding only exists near the core center. The fundamental mode of the core is localized mostly near the core axis, while higher-order core modes are delocalized closer to the edges and are rapidly leaking out. The pump cladding 205 surrounds the core 201 and signal claddings 202. Total internal reflection at the external surfaces of the pump cladding 205 confines pump light, and this is the region of the cross-section into which the pump beams are directed. The outer cladding 203 and the outer polymer coating 204 provide a strong mechanical structure for the entire fiber and protect the structure from environment. The outer cladding thickness in the narrow dimension is maintained thin enough so as to allow the fiber to be coiled. One embodiment of the disclosure uses outer cladding 203 of about 0.5 mm in the narrow dimension; however other thicknesses may also be utilized in other embodiments.

Figure 3:
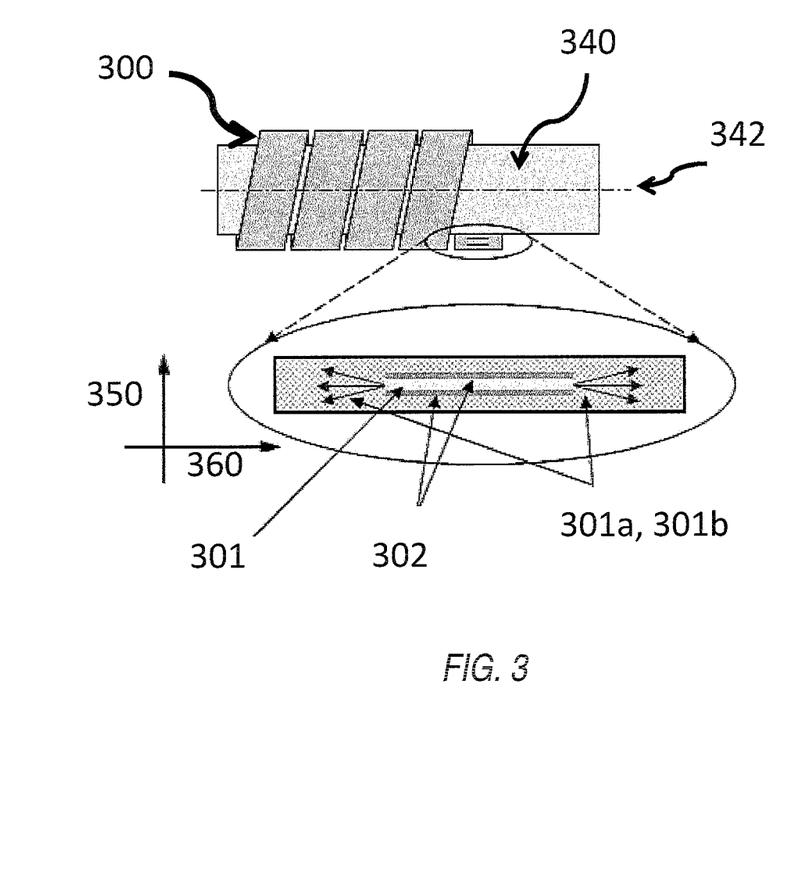
FIG. 3 shows a coiling of a Raman fiber around a cooler, according to an embodiment of the disclosure.

FIG. 3 shows a coiling of a Raman fiber 300 around a cooler 340, according to one of the embodiments of the disclosure. The Raman fiber 300 may be same as, or different than, the Raman fiber 200 described with references to FIGS. 1 and 2. As shown, Raman fiber 300 is coiled around the cooler 340 along a coil axis 342. In this configuration, a rectangular SHARC fiber is shown, and the details of a cross section of the Raman fiber 300 are shown in a blown up view.

For the blown-up cross section of FIG. 3, 360 represents the slow axis whereas 350 represents the fast axis. The core 301 is the Raman medium for which the doping characteristics were discussed in FIG. 2. The signal claddings 302 guide the signal along the top and bottom, while the signals are unguided at the edges 301a, 301b of the core 301 as shown, which provides for loss filtering.

FIG. 4 shows a rectangular Raman fiber 400 with curved edges 402a, 402b of the pump cladding 402 surrounding a rectangular doped core 401, according to an embodiment of the disclosure. In this embodiment, the body of the pump cladding serves as a signal cladding as well. The Raman fiber 400 may be similar to Raman fibers 200, 300 of FIGS. 1, 2, and 3, except that curved edges 402a, 402b of a pump cladding 402 are also shown all around the core 401—including the edges 401a, 401b. In this embodiment, the core 401 and the pump cladding 405 are of the same material, except that the core is doped with a profile as shown. Pump cladding can be also down-doped near the core center by F or other ions to provide a NA-profiling effect. The outer cladding 404 provides the necessary mechanical strength while maintaining the flexibility to be coiled.

Figure 5:
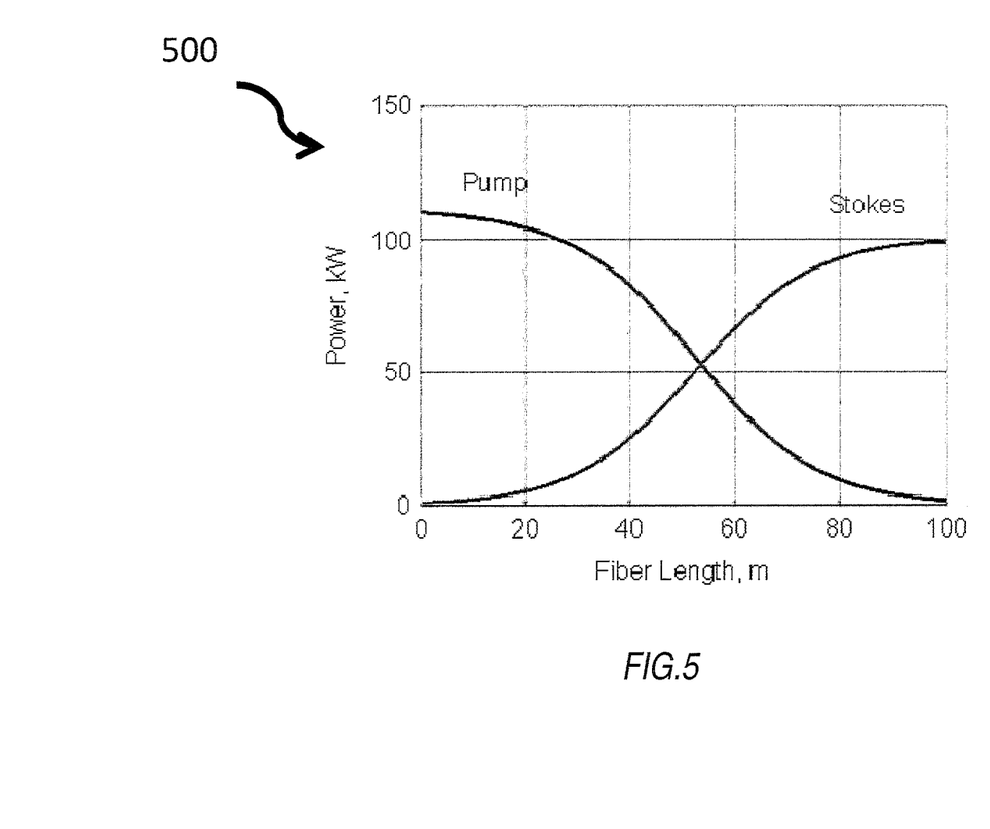
FIG. 5 shows a simulated Raman conversion of the embodiment shown in FIG. 2 as a function of fiber length.

FIG. 5 shows a simulated Raman conversion of the embodiment shown in FIG. 2 as a function of fiber length. The characteristic curve 500 obtained by simulation shows a 110 kW of pump power being launched into partially Ge doped silica fiber (the Raman gain coefficient is assumed to be 0.01 cm/GW), which has 25 µm×1.8 mm core, 60 µm×2 mm pump cladding dimensions, is 100 m long, and is seeded by 1 kW Stokes at the input. It demonstrates how the energy builds up for the Stokes primary mode as a function of the length of Raman fiber. The pump energy is converted to Stokes energy in the Raman fiber, as the signal travels through the long fiber. An energy efficiency of over 90% is achievable by an embodiment of the disclosure as shown. This calculation accounts for the fact that the Ge doping fills approximately half of the total core width. The calculation also includes a propagation loss of 2 dB/km, which is a reasonable value for high-quality silica fibers at wavelengths near 1 µm.

The necessary semi-guiding property can be achieved by a variety of design alternatives. As an example, in one embodiment, rough estimates for a 100 kW-class laser yield core dimensions of 25 µm×1.8 mm (aspect ratio of 72:1), pump-cladding dimensions of 60 µm×2 mm (aspect ratio of 33:1), and outer-cladding dimensions of 500 µm×2.5 mm (aspect ratio of 5:1). The core and pump-cladding areas are 45,000 $\mu m^2$ and 120,000 $\mu m^2$, for a core-to-cladding area ratio of 37.5%. The overall fiber length will be about 100 m. Assuming a Raman gain coefficient of 0.01 cm/GW for the Ge-doped silica and a total pump power of 110 kW that is uniformly distributed throughout the pump cladding, the product gIL is about 10, a reasonable value for a Raman amplifier. The pump power value assumes an overall conversion efficiency of 90% for a final output Stokes power of 100 kW.

In one embodiment, the dopant is Ge and the dopant concentration is maintained at about 3% molar concentration. The outer cladding refractive index must be low enough relative to the index of the pump cladding that the pump cladding will have a sufficient numerical aperture (NA) to capture and contain the launched power from the individual fiber lasers as shown in apparatus 100. The index must also be low enough that the core can have a satisfactory NA relative to the pump cladding. While the determination of the index values is a design trade that will be made in any specific embodiment, a rough guideline is that NA at the interface with the outer cladding of the pump cladding might be in the range of 0.22 to 0.27.

Embodiments of the disclosure can be implemented in applications where either the peak or average power or both exceed the levels tolerated by conventional fibers. Peak power is a term applied to a power level achieved during the duration of a laser pulse, and it is approximately equal to the pulse energy divided by the pulse length. For example, a fairly small energy of only 1 mJ can yield a peak power of 1 MW for a 1 nsec pulse length. The same energy can reach 1 GW for a pulse length of 1 psec. A high average power can be achieved with modest pulse energy of 10 mJ, for example, if the pulse repetition frequency (PRF) is high, for example 100 kHz. The average power is the product of the pulse energy and PRF. In this example, the average power is 1 kW. Of course, one can also operate a laser in continuous wave (CW) mode, in which case powers of 100 s of kW might be envisioned. The proposed Raman fiber design is flexible enough that it can be adapted to the particular peak and average power levels specified for that application. For a given peak or average power, the fiber core area and length will be determined such that the resulting intensity-length product, IL, is sufficient to yield the desired gain once the Raman medium and its gain coefficient, g, are known. But the design for a 100 kW peak power Raman amplifier and 100 kW CW power Raman amplifier can be different. They may have comparable values for the IL product, but the thermal load and fiber length could be much greater for the high-average-power application. Moreover, they both might require large core areas with appropriate cooling.

One of the attributes of certain embodiments of the disclosure is the ability to avoid the deleterious generation of a series of higher-order Stokes shifts, all of which would be produced in the core. This would occur in the following manner. In an embodiment, the energy is pumped in the pump cladding and a Stokes seed is launched into the SHARC core. The fiber Raman amplifier is designed such that the seed experiences a small-signal gain of approximately $e^{10}$, so that signal power will increase along the fiber length saturating the pump, as shown in FIG. 5. This figure also shows that the Stokes power will reach about 90% of the initial pump power at the output end of the fiber. If the pump and Stokes cross-sectional areas were the same, the second-Stokes signal would also have a small-signal gain of about $e^{10}$, which is still insufficient for a second-Stokes signal to build up from spontaneous noise. But, in fact, the Stokes beam resides within the core, which has a much smaller area than that of the pump cladding. Therefore, the second-Stokes signal actually experiences a gain of about $e^{10*Apc/Ac}$, where $A_{pc}$ and $A_c$ are the areas of the pump cladding and core, respectively. In this embodiment, this ratio is about 2.5, signifying that the second-Stokes will be very near threshold of $e^{25}$. As opposed to the first Stokes, which is seeded at the input, the second Stokes has no input seed except for very weak spontaneous Raman scattering. Even a gain of $e^{25}$ is insufficient to raise the spontaneous noise power to a level comparable to the first Stokes signal, and this signifies that this embodiment would operate with one, or possibly with a minor addition of the second, Stokes orders. For comparison, typical LMA fibers have core-cladding ratios <1%, which means the second-Stokes gain for the same conditions would be about $e^{1000}$. Since each increment in gain by about 25 to 30 leads to a successively higher Stokes order, such a high gain would yield several tens of Stokes orders. For most applications, operation in such high-order Stokes wavelengths is undesirable, if for no other reason than each successive Stokes order adds another increment in thermal load, due to the additional quantum defect between the initial pump photon and the output photon. For example, going from first to second Stokes will double the thermal load. Going from first to third Stokes will triple the thermal load, etc.

In the particular embodiment described in the preceding paragraph, and assuming a pump wavelength near 1 μm and a single Stokes shift of 440 cm$^{-1}$, the quantum defect will be about 4%. For the assumed 100 m length and a 100 kW output power, the thermal load for first-Stokes generation will be about 4 kW total. Adding in the absorption in the silica fiber of about 2 dB/km, or about 0.2 dB for the 100 m length, will increase the total thermal load by an additional 4 kW, for a length-averaged value of about 0.8 W/cm. Specific system designs can vary the design parameters, for example by increasing the fiber length, to reduce the W/cm value to a level compatible with the heat sink design.

In particular embodiments, a method of designing the Raman fiber has the following steps:
1. Specify the fiber length that yields a tolerable thermal load, in W/cm of fiber length;
2. Specify the pump-cladding area that yields gIL of about 10 for Raman amplifier;
3. Specify the core area that limits higher-order Stokes gIL product and thereby the number of Stokes orders that can be tolerated by the application; and
4. To increase reliability of operation, verify that the resulting core intensity does not approach a level near the damage limits of high-performance silica fiber lasers.

To estimate the total number of individual fiber pump lasers that can be launched into the Raman fiber amplifier, the first step is to calculate how many diffraction-limited spots might be launched into the pump cladding, and then to estimate how closely a large number of fiber pump lasers can be packaged. For example, as a notional design, an embodiment can have the outer cladding down-doped with F, such that the inner cladding could have a NA of about 0.27. Using this NA to establish the angular acceptance of a launched beam, and multiplying by the inner cladding dimensions indicated in the above embodiment, assuming a core size of 60 μm×2 mm, and further assuming a diffraction-limited beam at a wavelength of 1 μm, it can be shown that the pump cladding accommodates about 21×720=15,120 diffraction-limited spots.

It is important to determine a realistic pump-fiber packing fraction. In an embodiment where there is an array of typical LMA pump fibers with core/cladding diameters of 25/400 μm that are close-packed cladding-to-cladding (i.e. the polymer coating is removed), a fill factor of this array can be estimated as the fraction of the total area of the array that contains diffraction-limited pump beams. This is essentially the ratio of core area to cladding area of these fibers, which is about 3.9%. When this ratio is multiplied by the total pump-cladding area, measured in diffraction-limited spots, it yields about 50 spots. Even at 2 kW per fiber, this would yield 100 kW of pump power. But it is essential to recall the fact that this. Raman combining approach can accommodate pump fibers operating over a broad spectral band, not limited by SBS, and therefore capable of much higher single-fiber powers as high as 10 kW or more. Using this as an estimate of the power per fiber, one can couple up to 500 kW of pump power into the pump cladding, which greatly exceeds the requirement. This estimate is actually quite conservative, because it assumes the pump fibers are simply close-packed together. One can consider tapering the fibers as a means of increasing the fill factor. In another embodiment, the fill factor can be improved by following the pump-fiber array with an array of micro-lenses that could increase the fill factor by at least an order of magnitude. The rough calculations shown here support a fiber Raman combining apparatus that can certainly accommodate multi-100-kW of pump power, and is thereby traceable to HEL-class output powers.

Another feature of certain embodiments is that, unlike current BC approaches, certain embodiments are compatible with an all-glass architecture. For example, all-glass pump combiner technology can be extended to an embodiment of the disclosure, which yields components that are widely deployed to launch 10 to 20 diode pump beams into LMA fibers, to the case of about 11 input pump beams each generating 10 kW, for a total of 110 kW. The number could be increased to account for slight reductions in combining efficiency. This process can be extended to generate a very high total power at the launch point. In addition, at the output end of the Raman fiber, rather than just transitioning to a free-space beam, one can attach a passive high-aspect-ratio-core (HARC) beam-delivery fiber having core dimensions to accommodate the total power required.

Regarding the power dissipation in the Raman fiber, it can be designed to fit the characteristics of the fiber. For example, consider the prospect of optical damage with a 100 kW beam propagating in a core having dimensions as noted above, e.g., 25 μm×1.8 mm, and assuming the mode area being one half of the core area. The intensity for these conditions is about 450 MW/cm$^2$. For comparison, a standard LMA fiber with a 2 kW signal in a 20 μm core safely accommodates an intensity of 600 MW/cm$^2$. So, in this example embodiment, the Raman fiber will safely operate at about 75% of the intensity of an LMA fiber.

Certain embodiments of the disclosure also avoid the mode instability issues that presently limit the power in LMA fibers. The mode instability arises in Yb-doped fibers due to a positive feedback mechanism that gives rise to a thermally based nonlinearity. Specifically, any increase in the local pump extraction increases the local thermal load due to the extra quantum-defect heating. The increased extraction also increases the local ground-state population, and this enables additional pump absorption, which then further increases the thermal load due to the increased stimulated emission and quantum-defect heating. This thermal-runaway process enables two-wave mixing between the two lowest-order core modes, and this mixing appears as the mode instability. The thermal-runaway process is absent in a Raman amplifier, since increased local pump extraction simply depletes the pump and cannot lead to enhanced heat deposition.

In another embodiment, the design involves directly pumping the Raman fiber with multi-mode fibers, or even with diodes instead of diode-pumped fiber lasers. This latter approach would exploit the progress in pump-diode brightness that continues to be achieved, and it would raise the overall efficiency of the Raman fiber high energy laser to a level approaching that of the pump diodes themselves, which is much higher than that of the current-generation of BC fiber lasers.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A system comprising:
an optical fiber having a length, the optical fiber configured to receive inputs from multiple pump lasers operating at a first wavelength and an input from a seed laser source operating at a second wavelength, wherein:
the optical fiber has a core that is multimode and doped to enhance Raman gain and to serve as a fiber Raman medium;
the core has a center and a fiber axis at the center parallel to the length of the optical fiber;
the core has a higher concentration of doping at a location near the fiber axis than at a location further from the fiber axis;
the core is surrounded by a pump cladding;
the pump cladding is surrounded by an outer cladding;
the outer cladding is surrounded by an acrylate coating;
the first wavelength and the second wavelength differ by an amount corresponding to a Stokes Raman shift of the fiber Raman medium;
the optical fiber is configured to convert pump power to Stokes-shifted seed power along the length of the optical fiber through a Stimulated Raman Scattering (SRS) process; and
a ratio of an area of the core to an area of the pump cladding in a plane of cross-section perpendicular to the fiber axis equals or exceeds 0.30.

2. The system of claim 1, further comprising:
signal-combiner input optics configured to direct inputs from the multiple pump lasers to an area of the pump cladding and direct input from the seed laser source onto the core of the optical fiber; and
the core is a Semi-guiding High Aspect Ratio Core (SHARC).

3. The system of claim 2, wherein the core has dimensions of approximately 25 μm by 1.8 mm.

4. The system of claim 2, wherein:
the optical fiber has values of ncl, nr, and ns;
the value of ncl is less than the value of nr;
the value of nr is less than the value of ns;
ncl is a refractive index of the outer cladding;
nr is a refractive index of the pump cladding;
the core has an edge portion; and
ns is a refractive index of the edge portion of the core.

5. The system of claim 4, wherein the pump cladding has a numerical aperture between 0.1 and 0.27, inclusive.

6. The system of claim 2, where the pump cladding is gradually doped to create a numerical-aperture profiling effect by reducing a refractive index near the fiber axis.

7. The system of claim 2, wherein the signal-combiner input optics are monolithic and all-glass in which the multiple pump lasers and the seed laser source all arrive within input fibers and the input fibers are fused and combined into a single glass coupler that is spliced to the fiber Raman medium.

8. The system of claim 1, wherein:
the system further comprises a cooling system configured to cool the optical fiber, the cooling system having a cooling limit; and
the length of the optical fiber is selected so as to keep thermal dissipation per unit length of the optical fiber within the cooling limit and to provide a fiber temperature that is safe for the acrylate coating.

9. The system of claim 1, wherein the optical fiber has a gIL value of less than 25, the gIL value denoting a product of a Raman coefficient g of the optical fiber medium and the length L of the optical fiber carrying a laser intensity of I.

10. The system of claim 1, wherein the optical fiber is gradually doped with germanium (Ge).

11. A system comprising:
an optical fiber having a length, the optical fiber also having a core that is multimode and doped to enhance Raman gain and to serve as a fiber Raman medium, wherein:
the core has a center and a fiber axis at the center parallel to the length of the optical fiber;
the core has a higher concentration of doping at a location near the fiber axis than at a location further from the fiber axis;
the core is surrounded by a pump cladding;
the pump cladding is surrounded by an outer cladding;
the outer cladding is surrounded by an acrylate coating;
the optical fiber is configured to convert pump power input to Stokes-shifted seed power along the length of the optical fiber through a Stimulated Raman Scattering (SRS) process; and
a ratio of an area of the core to an area of the pump cladding in a plane of cross-section perpendicular to the fiber axis equals or exceeds 0.30.

12. The system of claim 11, wherein the optical fiber is a semi-guiding high aspect ratio core (SHARC) fiber.

13. The system of claim 11, wherein the optical fiber has a gIL value of less than 25, the gIL value denoting a product of a Raman coefficient g of the optical fiber medium and the length L of the optical fiber carrying a laser intensity of I.

14. The system of claim 11, wherein:
the optical fiber has values of ncl, nr, and ns;
the value of ncl is less than the value of nr;
the value of nr is less than the value of ns;
ncl is a refractive index of the outer cladding;
nr is a refractive index of the pump cladding;
the core has an edge portion; and
ns is a refractive index of the edge portion of the core.

15. The system of claim 11, wherein the optical fiber is gradually doped with germanium (Ge).

16. A method comprising:

combining inputs from multiple pump lasers operating at a first wavelength with an input from a Stokes seed laser operating at a second wavelength;

generating a combined laser pump power;

propagating the combined laser pump power onto an optical fiber having a core that is multimode, the optical fiber having a length; and converting at least part of the combined laser pump power to Stokes-shifted seed power along the length of the optical fiber through a Stimulated Raman Scattering (SRS) process;

wherein:

the core is doped to enhance Raman gain and to serve as a fiber Raman medium;

the core has a center and a fiber axis at the center parallel to the length of the optical fiber;

the core has a higher concentration of doping at a location near the fiber axis than at a location further from the fiber axis;

the core is surrounded by a pump cladding;

the pump cladding is surrounded by an outer cladding;

the outer cladding is surrounded by an acrylate coating;

the first wavelength and the second wavelength differ by an amount corresponding to a Stokes Raman shift of the fiber Raman medium; and a ratio of an area of the core to an area of the pump cladding in a plane of cross-section perpendicular to the fiber axis equals or exceeds 0.30.

17. The method of claim 16, wherein:

combining the inputs includes sending laser power from the multiple pump lasers into an area of the pump cladding and sending laser power from the Stokes seed laser into an area of the core;

the optical fiber comprises a Semi-guiding High Aspect Ratio Core (SHARC) fiber; and the core of the SHARC fiber is gradually doped with germanium (Ge).

18. The method of claim 16, wherein:

the optical fiber has values of ncl, nr, and ns;

the value of ncl is less than the value of nr;

the value of nr is less than the value of ns;

ncl is a refractive index of the outer cladding;

nr is a refractive index of the pump cladding;

the core has an edge portion; and ns is a refractive index of the edge portion of the core.

19. The method of claim 16, further comprising:

cooling the optical fiber using a cooling system, wherein the length of the optical fiber is selected so as to keep thermal dissipation per unit length of the optical fiber within a cooling limit of the cooling system and to provide a fiber temperature that is safe for the acrylate coating.

20. The method of claim 16, wherein the optical fiber has a gIL value of less than 25, the gIL value denoting a product of a Raman coefficient g of the optical fiber and the length L of the optical fiber carrying a laser energy intensity of I.

* * * * *